(12) United States Patent
Leonardi et al.

(10) Patent No.: US 9,137,954 B2
(45) Date of Patent: Sep. 22, 2015

(54) STUMP GRINDING TOOTH ASSEMBLY

(75) Inventors: Joseph Leonardi, Auburn, NY (US); Bruce C. Jordan, Auburn, NY (US)

(73) Assignee: Leonardi Manufacturing Co. Inc., Weedsport, NY (US)

( * ) Notice: Subject to any disclaimer, the term of this patent is extended or adjusted under 35 U.S.C. 154(b) by 733 days.

(21) Appl. No.: 12/679,335

(22) PCT Filed: May 7, 2008

(86) PCT No.: PCT/US2008/062900
§ 371 (c)(1),
(2), (4) Date: Mar. 22, 2010

(87) PCT Pub. No.: WO2009/025887
PCT Pub. Date: Feb. 26, 2009

(65) Prior Publication Data
US 2012/0024425 A1    Feb. 2, 2012

Related U.S. Application Data

(60) Provisional application No. 60/957,318, filed on Aug. 22, 2007.

(51) Int. Cl.
*A01G 23/06* (2006.01)
*B27G 13/10* (2006.01)
*B23D 61/06* (2006.01)

(52) U.S. Cl.
CPC .............. *A01G 23/067* (2013.01); *B23D 61/06* (2013.01); *B27G 13/10* (2013.01)

(58) Field of Classification Search
CPC .. A01G 23/093; A01G 23/067; B02C 18/184; B02C 18/182; B02C 18/146; B02C 18/06; B02C 18/18; B02C 18/186; B02C 7/12; B02C 13/2804; B27G 13/02; B27G 13/04; B27G 13/10; B23C 2210/165; B23C 5/2204; B23C 5/2208
USPC ................. 144/24.12, 235, 240, 241; 37/302; 83/839–845, 955; 407/48, 406, 65, 407/113–116
See application file for complete search history.

(56) References Cited

U.S. PATENT DOCUMENTS 3,872,763 A    3/1975 Kayachara
4,193,638 A *  3/1980 Heckenhauer ................ 299/101
4,709,736 A    12/1987 Bellars
(Continued)

FOREIGN PATENT DOCUMENTS

DE    10304732    8/2004
JP    05-024305    3/1993
(Continued)

*Primary Examiner* — Shelley Self
*Assistant Examiner* — Matthew G Katcoff
(74) *Attorney, Agent, or Firm* — George R. McGuire; Frederick J.M. Price; Bond Schoeneck & King, PLLC

(57) ABSTRACT

A stump cutting assembly mounted to a stump cutting wheel. Stump cutting assembly is a stump cutting tooth interconnected to the wheel by a holder or block that is fixed to wheel by welding or other equivalent process, an optional debris deflector and a fastener that interconnects tooth and deflector to holder. As wheel rotates about its axis of rotation, the tooth cuts away at wood or other debris in which it comes into contact through the side to side and/or longitudinal movement of a stump grinder unit.

6 Claims, 18 Drawing Sheets

(56) References Cited

U.S. PATENT DOCUMENTS

| | | | |
|---|---|---|---|
| 4,750,396 A | 6/1988 | Gaddis | |
| 4,759,394 A | 7/1988 | Clemenson | |
| 4,947,721 A | 8/1990 | Anderson | |
| 4,974,649 A | 12/1990 | Manning | |
| 5,058,477 A | 10/1991 | MacLennan | |
| 5,085,112 A | 2/1992 | MacLennan | |
| 5,088,371 A | 2/1992 | MacLennan | |
| 5,131,305 A | 7/1992 | MacLennan | |
| 5,211,212 A | 5/1993 | Carlson | |
| 5,269,355 A * | 12/1993 | Bowen | 144/223 |
| 5,381,840 A * | 1/1995 | Bowen | 144/24.12 |
| 5,423,361 A * | 6/1995 | Richards | 144/341 |
| 5,555,652 A | 9/1996 | Ashby | |
| 5,743,314 A | 4/1998 | Puch | |
| 5,819,827 A | 10/1998 | Leonardi | |
| 5,966,657 A | 10/1999 | Sporre | |
| 5,996,657 A | 12/1999 | Riesselman | |
| 6,047,749 A | 4/2000 | Lamb | |
| 6,053,672 A * | 4/2000 | Satran et al. | 407/40 |
| 6,089,480 A * | 7/2000 | Rawlings | 241/73 |
| 6,138,725 A | 10/2000 | Leonardi et al. | |
| 6,176,445 B1 | 1/2001 | Shinn | |
| 6,263,930 B1 | 7/2001 | Wiley | |
| 6,382,277 B1 | 5/2002 | Paumier et al. | |
| 6,698,477 B1 * | 3/2004 | Bennington | 144/235 |
| 6,834,692 B2 * | 12/2004 | Lindsay et al. | 144/241 |
| 6,877,535 B1 | 4/2005 | Bennington | |
| 7,094,007 B2 * | 8/2006 | Satran et al. | 407/113 |
| 7,100,651 B1 | 9/2006 | Monyak et al. | |
| 7,484,541 B2 | 2/2009 | Green | |
| 7,600,543 B2 | 10/2009 | Monyak et al. | |
| 7,713,006 B2 * | 5/2010 | MacLennan et al. | 407/113 |
| 7,743,803 B2 | 6/2010 | Paumier | |
| 2003/0145710 A1 | 8/2003 | Hicks | |
| 2003/0209285 A1 | 11/2003 | Ziehm | |
| 2007/0042323 A1 | 2/2007 | Florman | |
| 2008/0105334 A1 | 5/2008 | Leonardi et al. | |
| 2008/0149224 A1 | 6/2008 | Kappel | |

FOREIGN PATENT DOCUMENTS

| | | |
|---|---|---|
| JP | 06-125920 | 5/1994 |
| JP | 2000071203 | 3/2000 |
| JP | 03-233454 | 6/2007 |
| WO | 01/68298 | 9/2001 |
| WO | 03/013773 | 2/2003 |

* cited by examiner

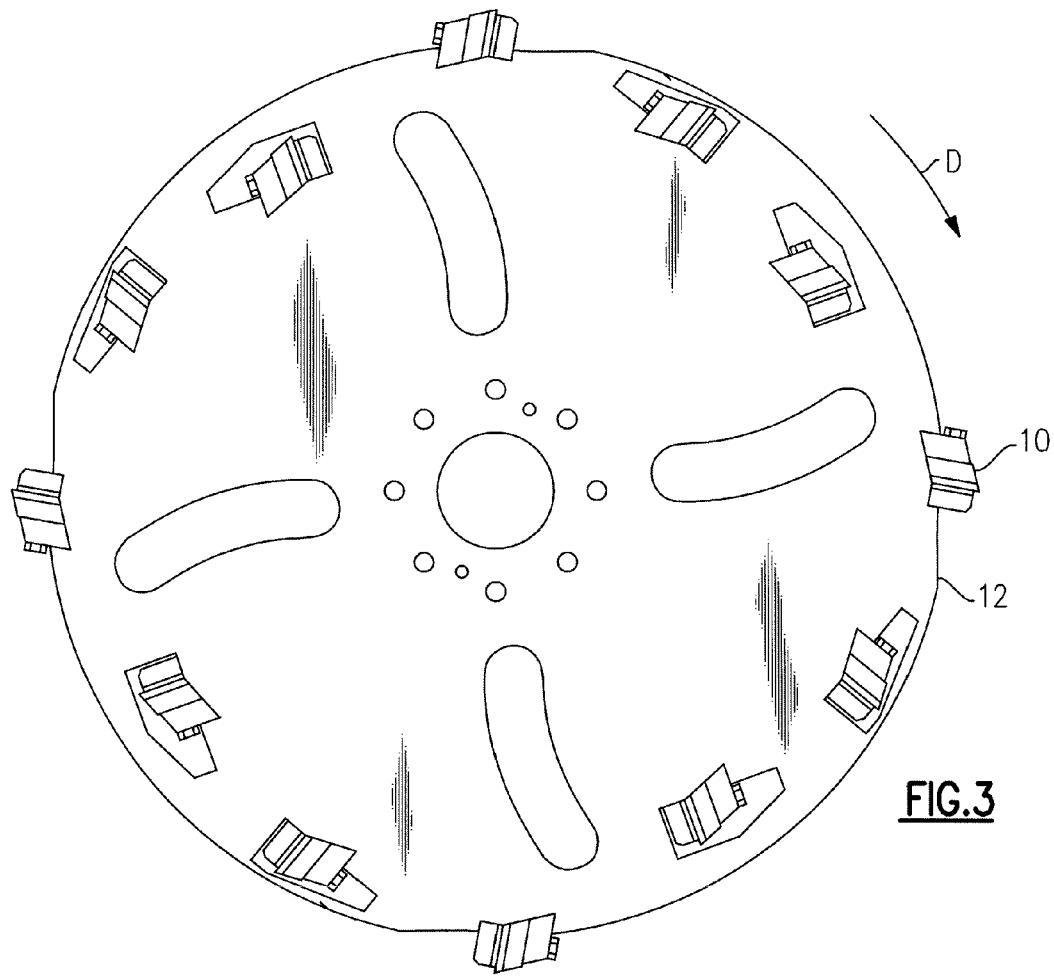
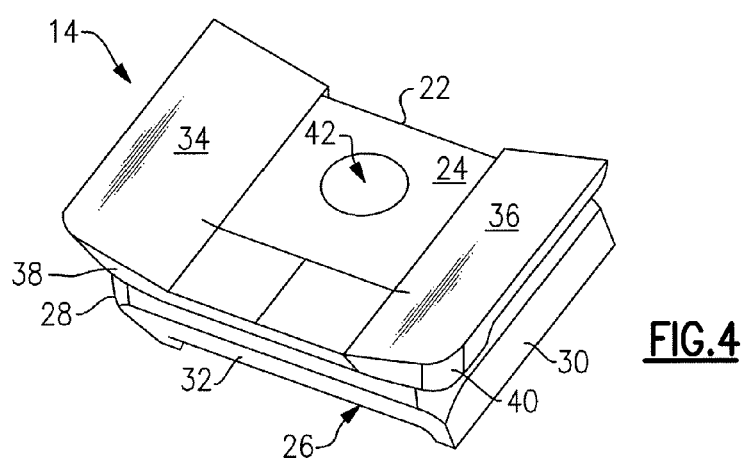

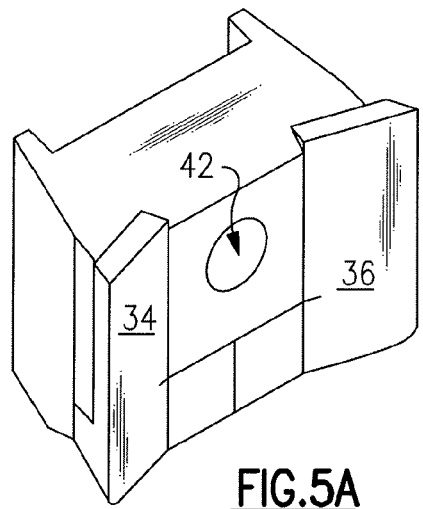
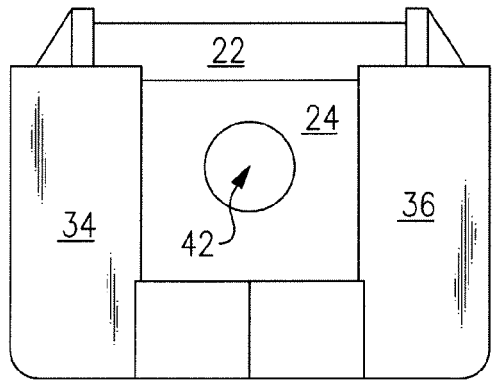
FIG.5A  FIG.5B
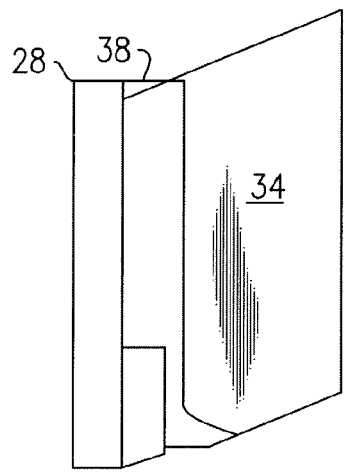
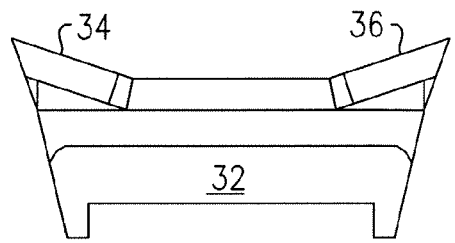
FIG.5C  FIG.5D

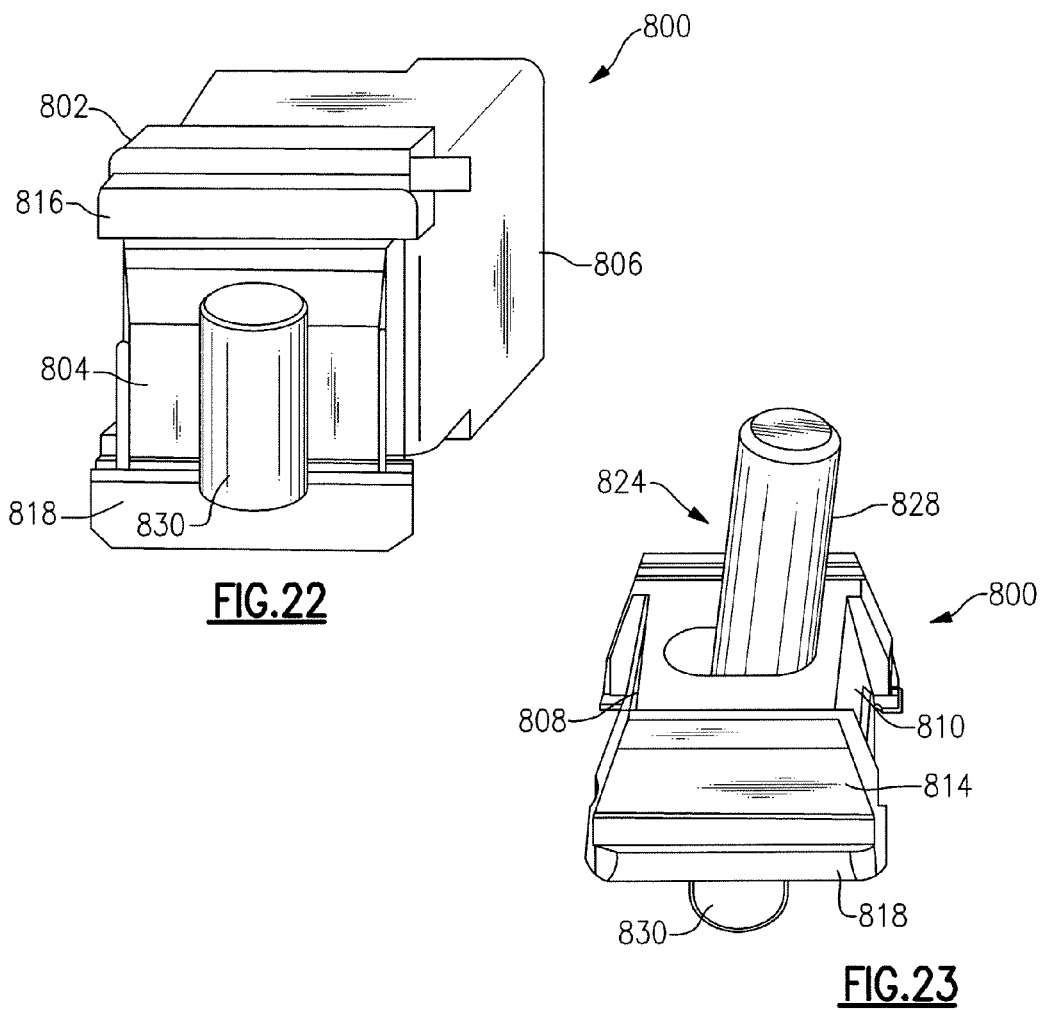
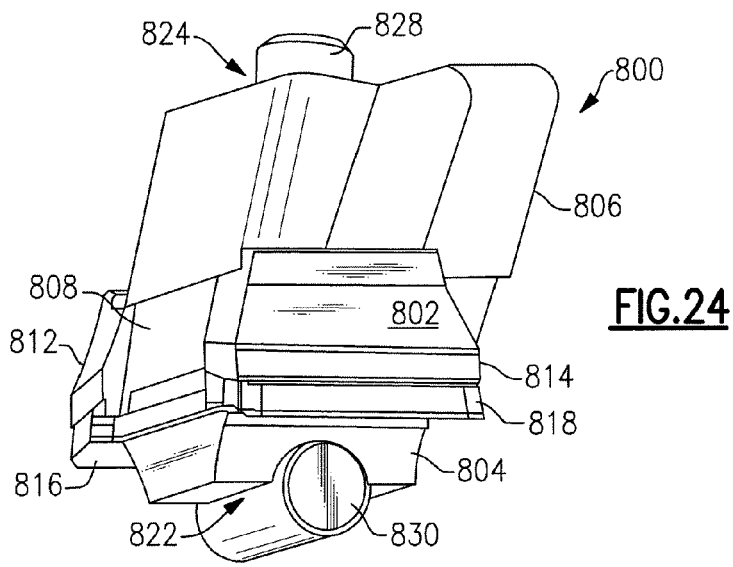

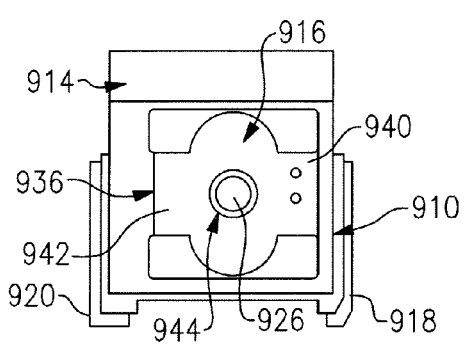
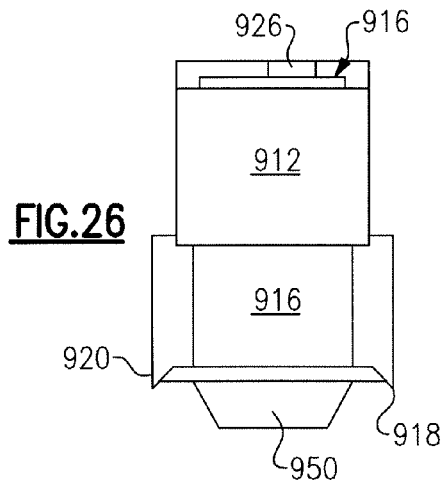
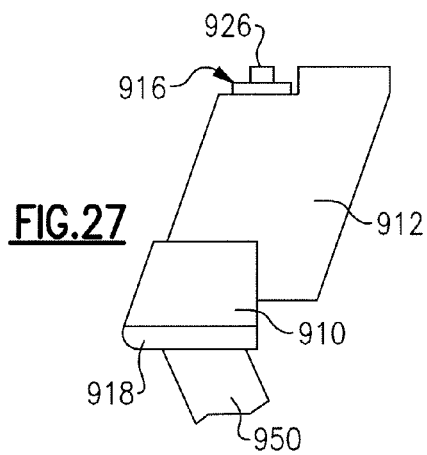
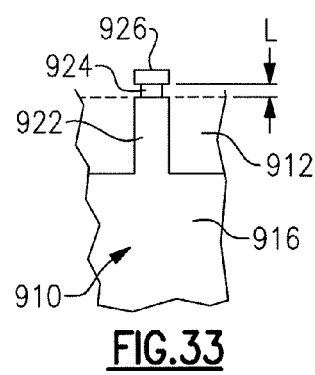
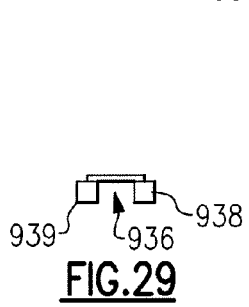
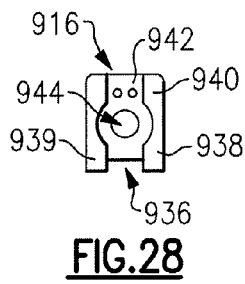
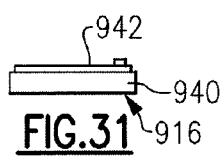
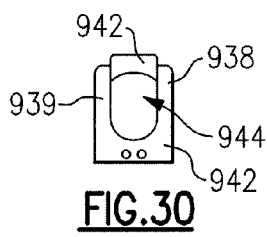
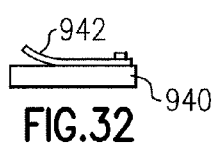

STUMP GRINDING TOOTH ASSEMBLY

CROSS-REFERENCE TO RELATED APPLICATIONS

The present application claims priority to PCT Number PCT/US2008/062900 which claims priority to U.S. Provisional Application No. 60/957,318, filed on Aug. 22, 2007, hereby incorporated by reference in its entirety.

BACKGROUND OF THE INVENTION

The present invention relates generally to stump grinding teeth, and more particularly to a mechanism for retaining a stump grinding tooth to a stump grinding tooth mounting mechanism.

Stump grinders are well known in the art. These machines typically comprise a stump grinding wheel that is mounted for rotary motion to a chassis and driven by a motor. A plurality of stump grinding teeth are mounted to the wheel in annularly spaced relation to one another, either to the side surfaces of the wheel or to the peripheral edge of the wheel. In either event, a mounting mechanism is used to fix the tooth relative to the wheel.

In its most basic embodiment, a pocket clamps a tooth to the wheel and a pair of blots fixes the pocket to the wheel. In embodiments where the tooth is mounted around the peripheral edge of the wheel, an O-ring or similar type of fastening mechanism is used to fix the tooth to the mounting block which in turn may be brazed or otherwise affixed to the wheel. Regardless of the type of mounting mechanism used, it takes a bit of time and tools to detach a worn or broken tooth from a mounting mechanism, and replace it with a new tooth.

While wood generally degrades the edge of the cutting bits, oftentimes they come into contact with foreign objects embedded in the wood, such as rock, nails, or other hard substances. The impact with these objects accelerates the degradation of the cutting bits. Once the edge is worn beyond an acceptable limit, the tooth or teeth must be changed.

Traditionally, changing the teeth required the operator to use a drill or other tool to remove bolts that fasten a pocket to the wheel. The teeth, in turn, are clamped to the wheel by the pockets. This process is laborious, and with conventional teeth, the entire tooth has to be discarded and replaced with a new tooth. Thus, in addition, to the downtime associated with changing the teeth, the teeth themselves raise the expense associated with the grinding operation.

It is a principal object and advantage of the present invention to provide a clip that expedites the removal and replacement of a stump grinding tooth to a mounting mechanism.

It is another object and advantage of the present invention to provide a tooth retaining clip that adds durability to the tooth assembly.

It is therefore a principal object and advantage of the present invention to provide a tooth assembly that reduces the labor associated with having to change a tooth on a grinding machine.

It is another object and advantage of the present invention to provide a tooth assembly that permits cutting bits to be replaced as opposed to having to replace an entire tooth, thereby lowering the cost to the lowest consumable.

Other objects and advantages of the present invention will in part be obvious and in part appear hereinafter.

SUMMARY OF THE INVENTION

In accordance with the foregoing objects and advantages, the present invention provides a spring clip that is affixed to a mounting block and is adapted to securely engage and retain a stump grinding tooth to the mounting block. The clip includes two pieces: a base and a spring member that is securely attached in cantilevered fashion to the base. The base comprises a flattened piece of material having a U-shaped groove defined between two legs that extend from the rearward section of the base. The spring member comprises a flattened piece of resilient material that overlays the base member and is riveted or otherwise affixed to the base member at its rearward section. The spring member further comprises a circular opening defined through a central part thereof with the leading part of the spring member being accessible to a finger tip or tool positioned in the U-shaped groove of the base member. The circular opening is aligned with the U-shaped groove such that a gap exits between the mounting block and the circular opening. By engaging the leading edge of the spring member with a finger tip or tool and prying upwardly, the leading part of the spring member will bias away from the base member and upon release will return to contacting relation with the base member.

The stump grinding tooth associated with the present invention is of the type that includes an elongated shaft extending upwardly from the tooth portion. The shaft is adapted to extend through an opening formed through a mounting block that is adapted for connection to the stump grinding wheel. A reduced diameter region is formed adjacent the top of the shaft and extends entirely through the mounting block. A head is formed on the top of the shaft. To interconnect the tooth to the mounting block, the elongated shaft is inserted through the opening in the mounting block and the U-shaped groove of the clip's base is slid into engaged relation with the reduced diameter section of the shaft. If necessary, the leading edge of the spring member is biased away from the base so as to ride over the top of the head of the tooth's shaft. By continuing to push the clip over the shaft the head of the shaft will ultimately snap through the circular opening in the spring member which will bias downwardly into contacting relation with the base.

The thickness of the reduced diameter portion of the shaft is about the same as or just slightly larger than the thickness of the clip (the combined base and spring member thickness when the two members are in overlying relation to one another). Thus, when the head of the tooth's shaft snaps through the circular opening in the spring member the spring member and the base engage the reduced diameter portion of the shaft. Absent an external force biasing the spring away from the base, the clip will retain the tooth in fixed relation to the mounting block.

BRIEF DESCRIPTION OF THE DRAWINGS

The present invention will be more fully understood and appreciated by reading the following Detailed Description in conjunction with the accompanying drawings, in which:

FIG. 3 is a side view of a wheel assembly according to the present invention.

FIG. 4 is an embodiment of a tooth assembly according to the present invention.

FIG. 5A-5D is embodiment of a tooth assembly according to the present invention.

FIG. 22 is an embodiment of a tooth assembly according to the present invention.

FIG. 23 is an embodiment of a tooth assembly according to the present invention.

FIG. 24 is an embodiment of a tooth assembly according to the present invention.

FIG. 25 is a top plan view of the present invention;

FIG. 26 is a front elevation view thereof;

FIG. 27 is a side elevation view thereof;

FIG. 28 is a top plan view of the clip;

FIG. 29 is a front elevation view of the clip;

FIG. 30 is a bottom plan view of the clip;

FIG. 31 is a side elevation view of the clip;

FIG. 32 is a side elevation view of the clip with the spring member's leading edge illustrated as biased away from the base member; and FIG. 33 is a partial cut-away view of the tooth and mounting block.

DETAILED DESCRIPTION

Figure 1:
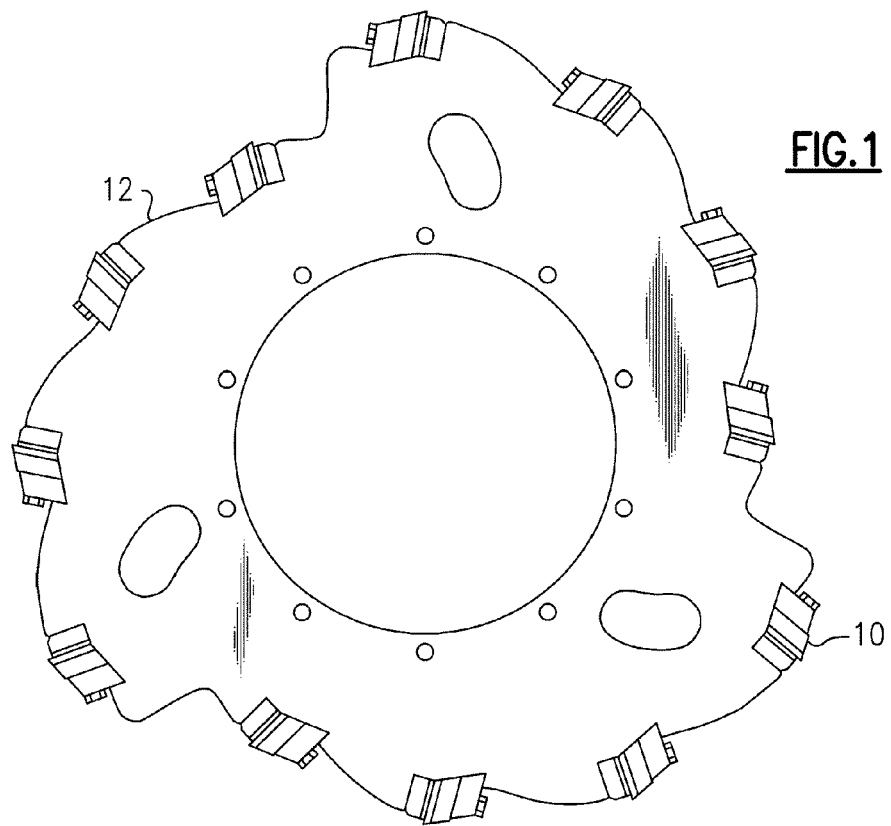
FIG. 1 is a side view of a wheel assembly according to the present invention.
Figure 2:
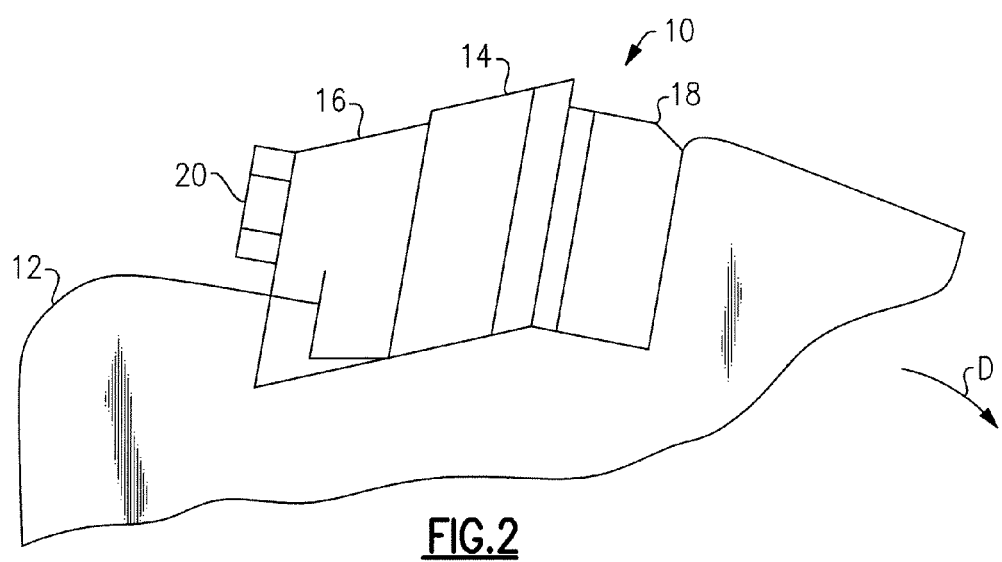
FIG. 2 is a tooth assembly according to the present invention.
Figure 6A:
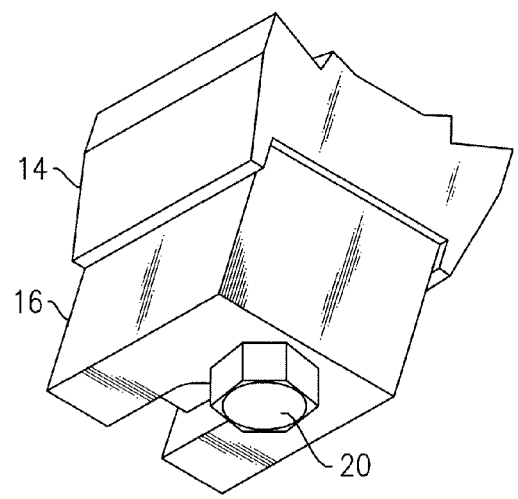
FIG. 6A-6D is an embodiment of a tooth assembly according to the present invention.
Figure 6B:
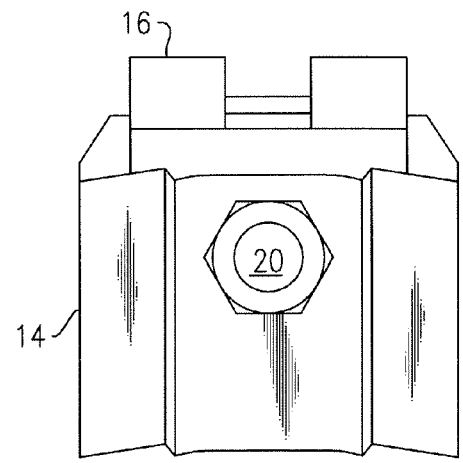
Figure 6C:
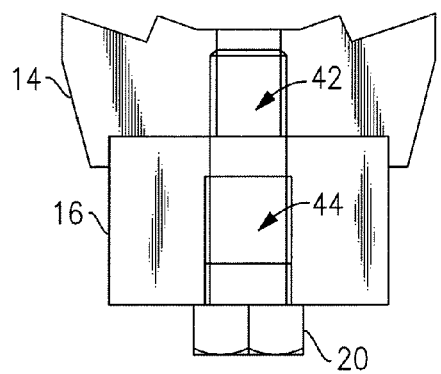
Figure 6D:
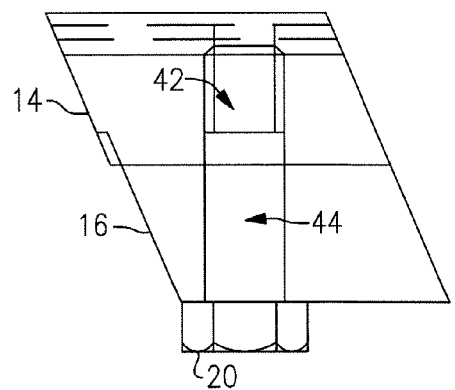

Referring now to the drawings in which like reference numerals refer to like parts throughout, there is seen FIGS. 1-3 a stump cutting assembly, designated generally by reference numeral 10, mounted to a stump cutting wheel 12. Stump cutting assembly 10 generally comprises a stump cutting tooth 14 interconnected to wheel 12 by a holder/block 16 that is fixed to wheel 12 by welding or other equivalent process, an optional debris deflector 18 and a fastener 20 that interconnects tooth 14 and deflector 18 to holder 16. As wheel 12 rotates in the direction indicated by arrow D about its axis of rotation R-R, tooth 14 cuts away at wood or other debris in which it comes into contact through the side to side and/or longitudinal movement of a stump grinder unit (grinding unit not shown).

With reference to FIGS. 4-7, tooth 14 comprises a body 22 that includes an upper surface 24, a lower surface 26, opposed side surfaces 28, 30, and a front surface 32. In its preferred form, tooth 12 includes cutting bits 34, 36, preferably composed of carbide, or a similarly hard material, brazened, or otherwise integrated, to shoulders 38, 40, respectively, formed at the interfaces of front surface 32 and side surfaces 28, 30, respectively, and at the boundary of lower surface 26. An opening 42 is formed through tooth 14 extending from its lower surface 26 up through its upper surface 24, for purposes of permitting passage of fastener 20 therethrough, as will be described in greater detail hereinafter. As seen in FIGS. 6A-D, tooth 14 may be comprise two elements supported by fastener 20 passing therethough.

Figure 7A:
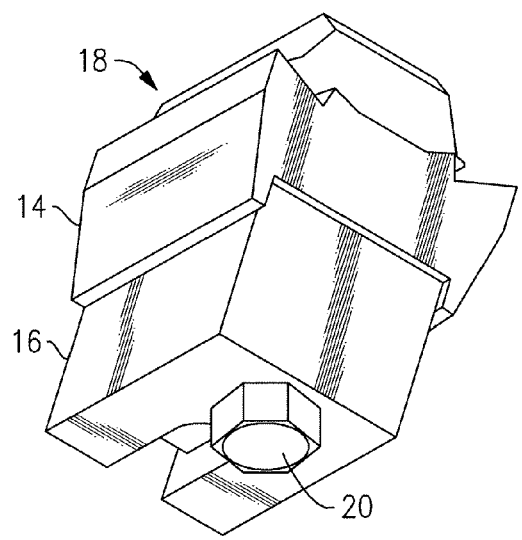
FIG. 7A-7D is an embodiment of a tooth assembly according to the present invention.
Figure 7B:
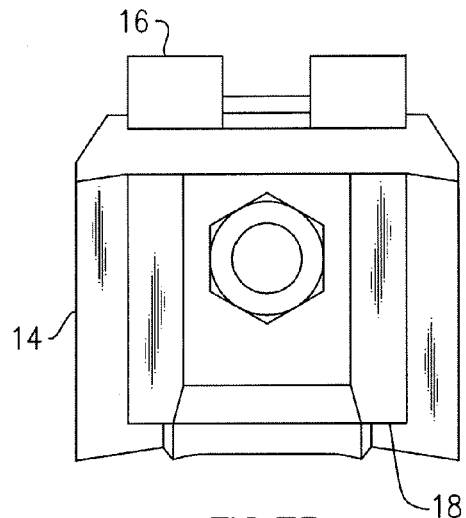
Figure 7C:
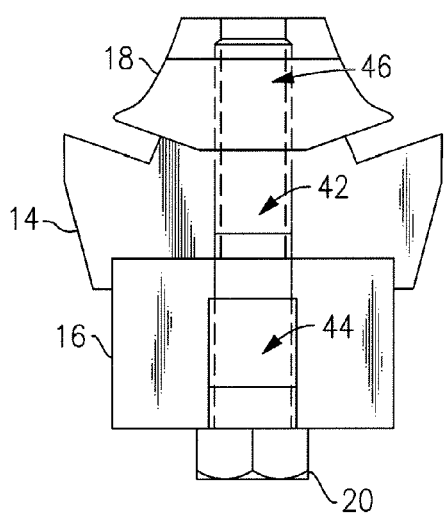
Figure 7D:
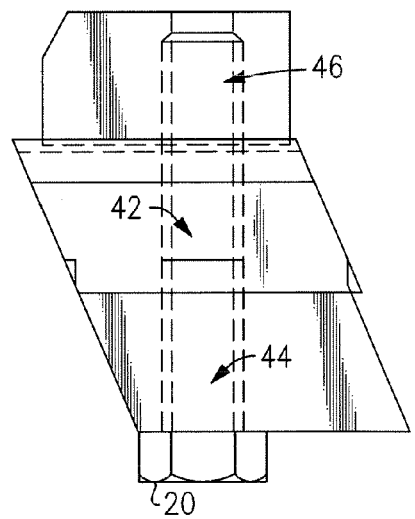
Figure 8:
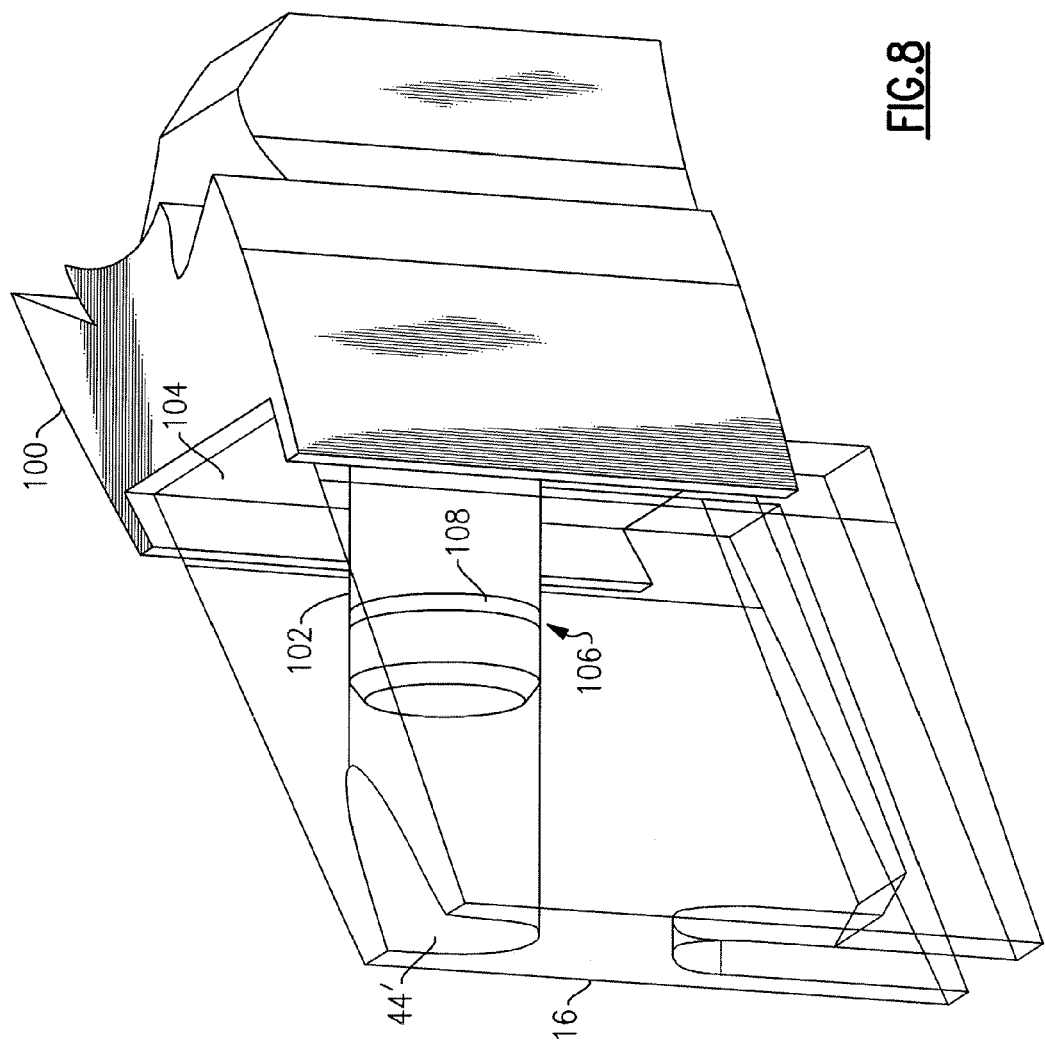
FIG. 8 is an embodiment of a tooth assembly according to the present invention.
Figure 9A:
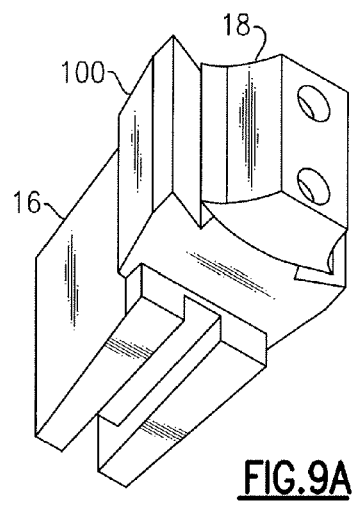
FIG. 9A-9D is an embodiment of a tooth assembly according to the present invention.
Figure 9B:
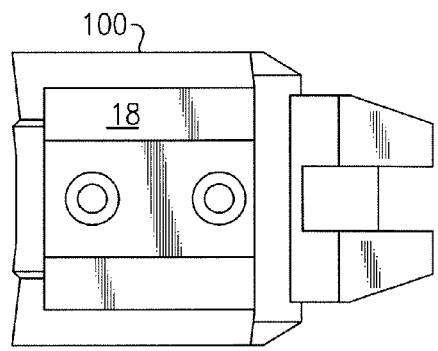
Figure 9C:
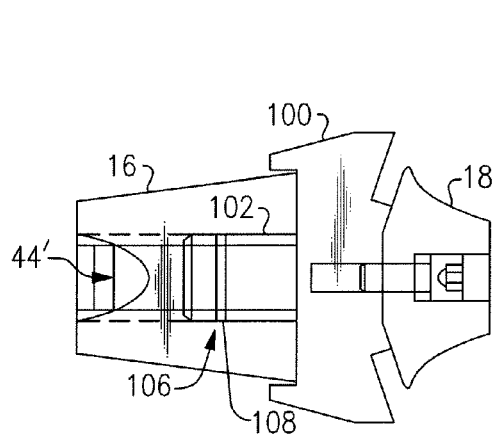
Figure 9D:
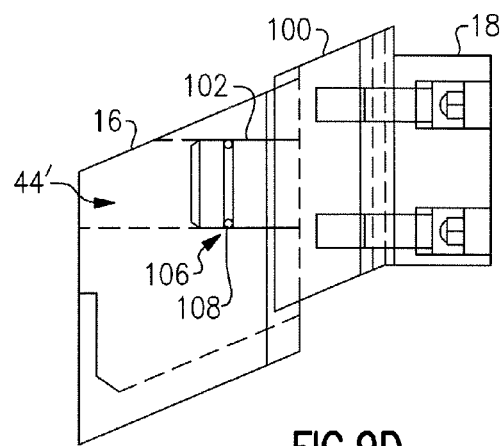

For purposes of fastening tooth 14 and deflector 18 to holder 16, holder 16 and deflector 18 also include openings 44, 46, respectively formed therethrough. Tooth 14, holder 16, and deflector 18 are assembled with openings 42, 44, 46, respectively, axially aligned, and fastener 20 then passing through opening 44 first, followed by openings 42 and 46, as seen in FIGS. 7A-C. Fastener 20 may be secured via a threaded connection or other conventional fastening systems. Therefore, if a stump grinder having assembly 10 is being used and a tooth 14 needs to be replaced, all that is necessary is for the operator to remove the fastener 20 associated with the impaired tooth 14, position a new tooth 20 in position, and re-fasten the assembly 10 with fastener 20.

In a second embodiment of the present invention shown in FIGS. 8 and 9A-D, a tooth 100 includes a post 102 extending outwardly from its upper surface 104. Post 102, which includes an annular groove 106 formed therein adjacent its free end and a sealing member 108, such as an O-ring, that is positioned in groove 106, is adapted to be inserted into opening 44' formed in holder 16'. A fastening element (not shown) is inserted through opening 44' and frictionally engages sealing member 108 in annular groove 106 to secure the interconnection between tooth 100 and holder 16'. To disassemble, an operator need only apply a pulling force to the end of the fastening member such that it disengages from annular groove 106.

Figure 10:
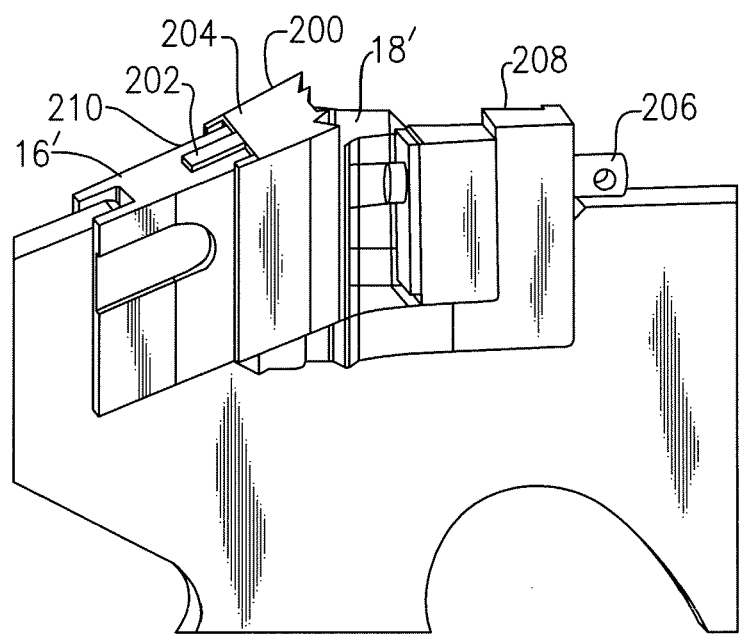
FIG. 10 is an embodiment of a tooth assembly according to the present invention.

In a third embodiment shown in FIG. 10, a tooth 200 is equipped with a male dovetail joint 202 formed on its upper surface 204 that interfaces with a corresponding female portion 210 formed in the lower surface of holder 16'. An opening formed in dovetail 202 is adapted to receive a threaded fastener 206, which can, for example, be in the form of a Phillips Head screw and that includes a retaining member 208 that securely engages the peripheral edge of wheel 12 and includes an angled extension that includes an opening through which fastener 206 passes and is positioned between the head of fastener 206 and holder 16'.

Figure 11:
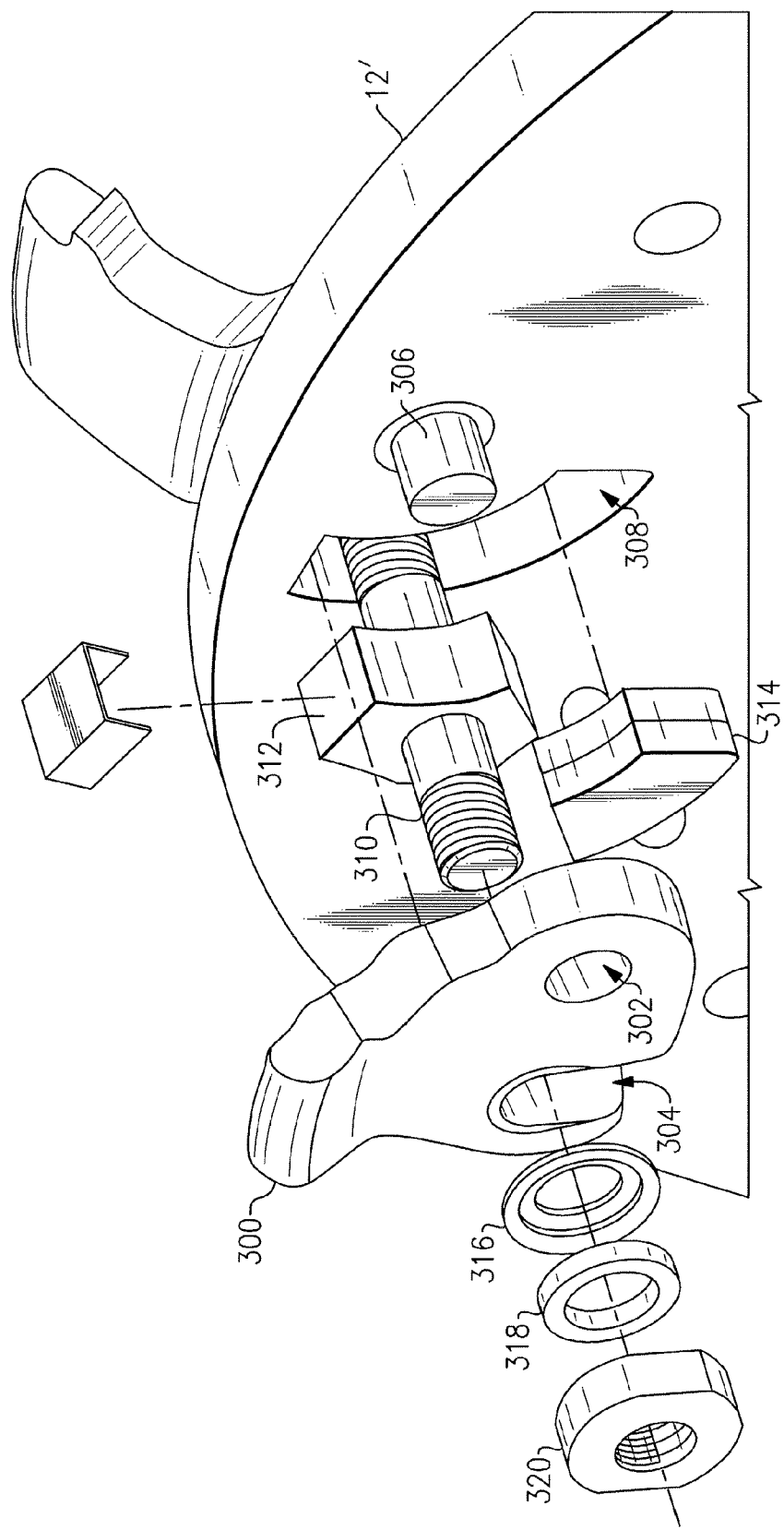
FIG. 11 is a perspective view of an embodiment of a wheel and tooth assembly according to the present invention.

In a fourth embodiment shown in FIG. 11, a tooth 300 attaches directly to a wheel 12' without a holder, but is nonetheless a quick-connect type of connection. In this embodiment, tooth 300 includes a body region with a first hole 302 formed therethrough and a second opening 304 (the opening 304 may be either open through the periphery of the tooth, as shown, or it may be a hole that is formed through the body region and is not open through the periphery of the tooth). A post 306 extends outwardly from opposing sides of wheel 12' (actually a pair of posts, one from each side, extend along a common axis), and a slot 308 is formed through wheel 12' a predetermined lateral distance from post 306. An axle 310 with opposed threaded ends, extends along an axis that is transverse to the plane of the wheel and through slot 308, and includes a medial body portion 312 that is shaped to snugly fit within and conform to the shape of slot 308. In addition, a shock absorbing member 314 is also positioned in the space within slot 308 and fills the space within the slot that is not occupied by body portion 312. Shock absorbing member 314 can be, for example, compressed wire mesh.

In attaching tooth 300 to wheel 12', opening 302 is passed about post 306, and opening 304 is passed over one end of axle 310 (thus the predetermined lateral spacing between post 306 and axle 310 is equal to the distance separating openings 302 and 304.) A washer 316 and O-ring 318 are then slipped over the end of axle 310, and a nut 320 is threaded onto the end of axle 310 to secure tooth 300 is position relative to wheel 12'. To change tooth 300, the operator needs only remove nut 320 using a wrench or pliers, pull the damaged tooth off of axle 310, place a new tooth in its place, and re-assemble washer 316, O-ring 318 and nut 320.

Figure 12A:
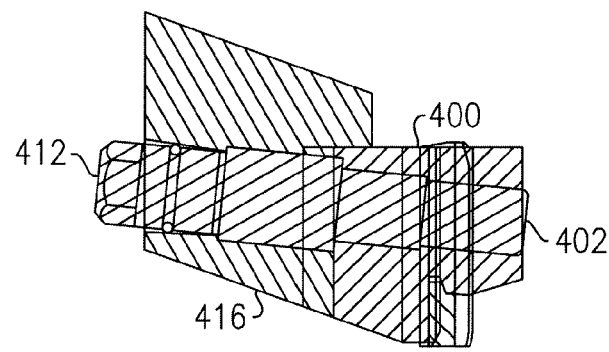
FIG. 12A-12C is a cross-section of an embodiment of a tooth assembly according to the present invention.
Figure 12B:
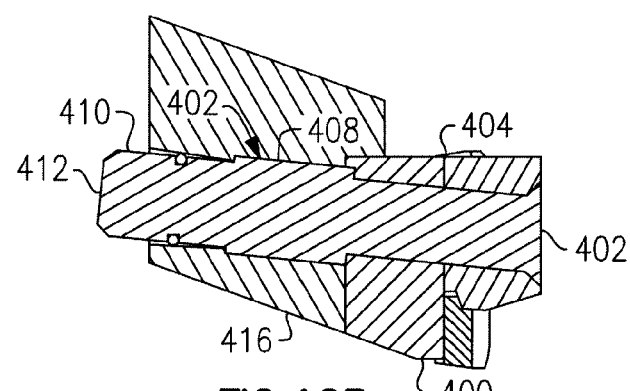
Figure 12C:
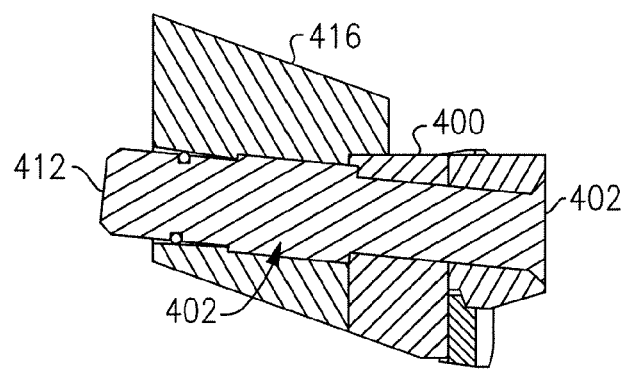
Figure 13A:
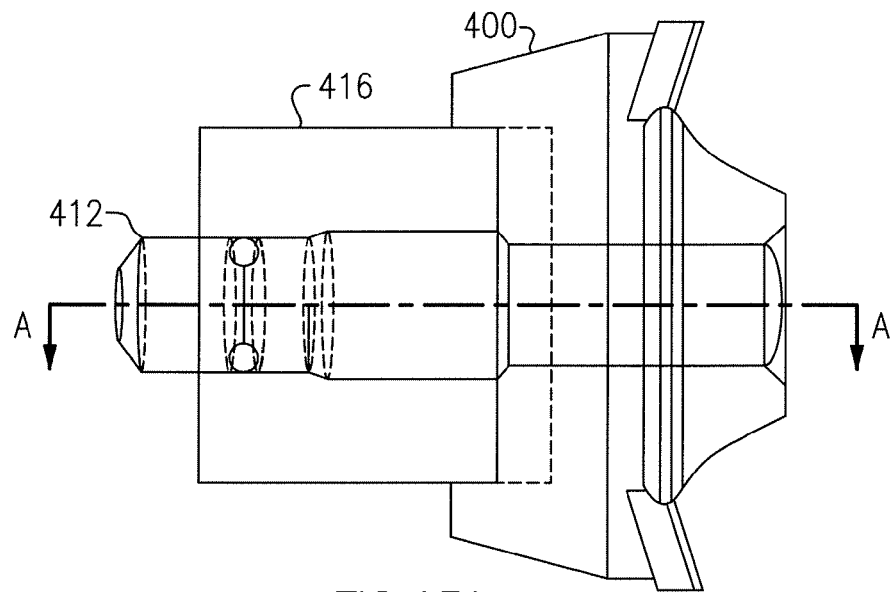
FIG. 13A-13B is a cross-section of an embodiment of a tooth assembly according to the present invention.
Figure 13B:
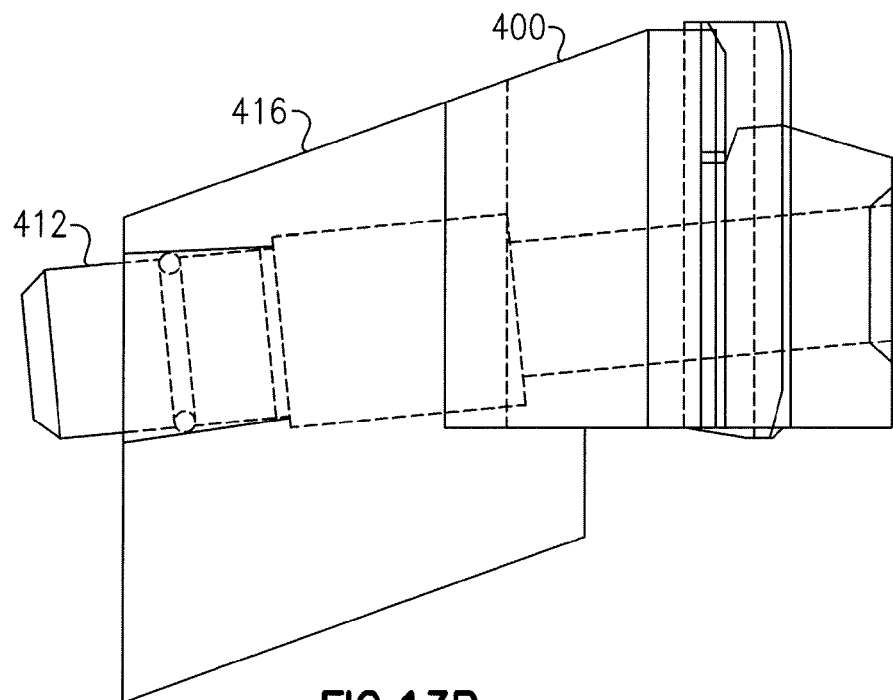
Figure 14A:
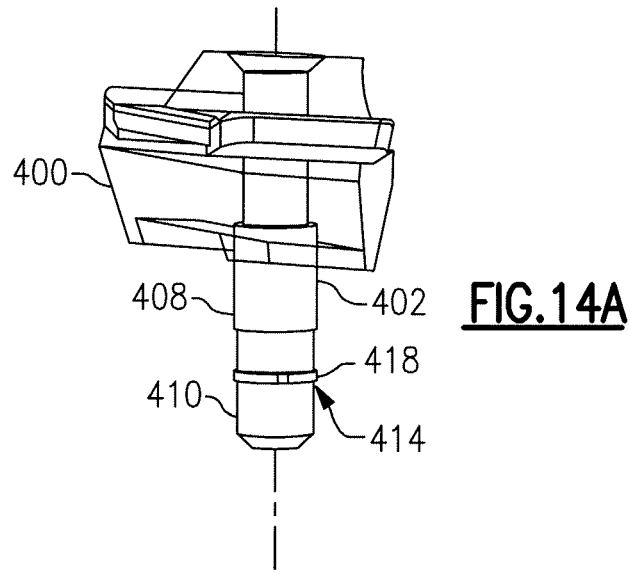
FIG. 14A-C is a perspective view of an embodiment of a tooth assembly according to the present invention.
Figure 14B:
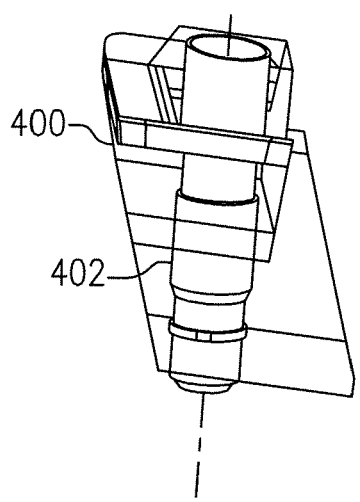
Figure 14C:
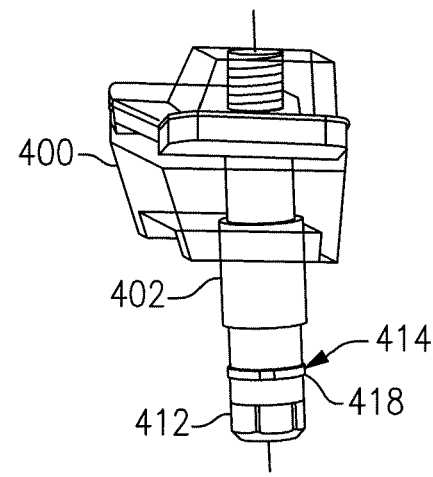

In a fifth embodiment shown in FIGS. 12-14, a tooth 400 includes an elongated post 402 (with respect to the second embodiment of the present invention shown in FIGS. 8 and 9A-D) that extends outwardly from its upper surface 404. Post 402 is dimensioned to extend entirely through holder/block 416, which includes an opening 406 formed therethrough for accepting post 402. Post 402 generally comprises a first portion 408 having a first diameter extending from tooth 400, a second portion 410 extending from first portion 408 and having a second diameter that is slightly smaller than the first diameter, and an end cap 412 at the terminal end of post 402. The diameter of first portion 408 is selected to allow frictional engagement with the interior surface of opening 406 formed through holder 416. As the diameter of second portion 410 is slightly smaller that first portion 408, post 402 is, at first, easily received within hole 418 and then, as post 402 is advanced further into opening 406, brought into frictional engagement with holder 416. Tooth 400 may be removed from holder 416 by applying an external force to end cap 412, thereby driving post 402 out of opening 406 until first portion 408 is no longer in frictional engagement with opening 406. Second portion 410 may include a circumferential groove 414 formed therein for housing a sealing member 418, such as an o-ring, for further frictional engagement with the interior of opening 406.

Figure 15:
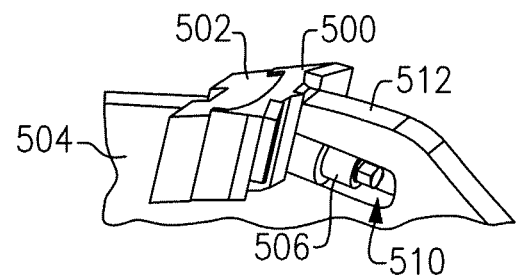
FIG. 15 is an embodiment of a tooth assembly according to the present invention.
Figure 16A:
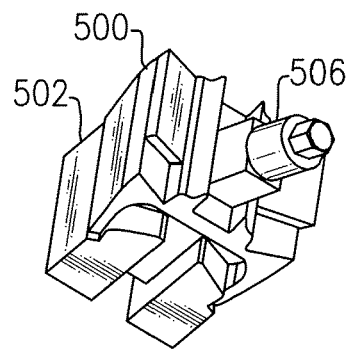
FIG. 16A-16D is an embodiment of a tooth assembly according to the present invention.
Figure 16B:
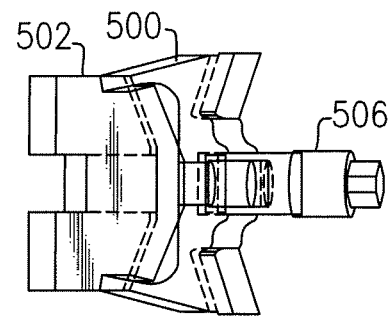
Figure 16C:
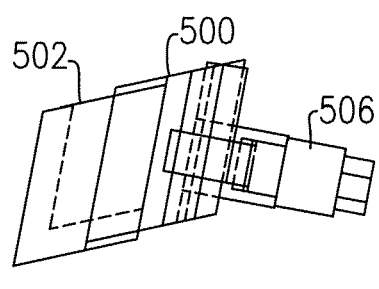
Figure 16D:
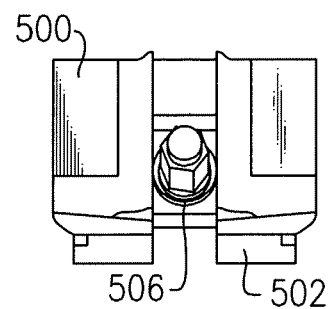
Figure 17A:
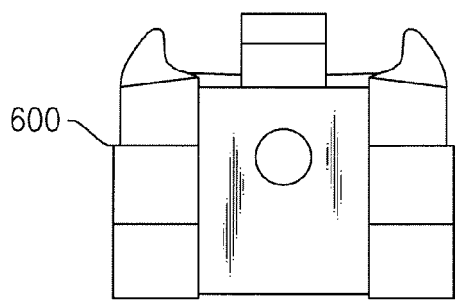
FIG. 17A-17E is an embodiment of a tooth assembly according to the present invention.
Figure 17B:
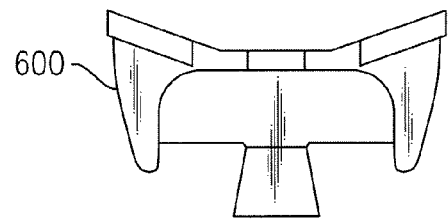
Figure 17C:
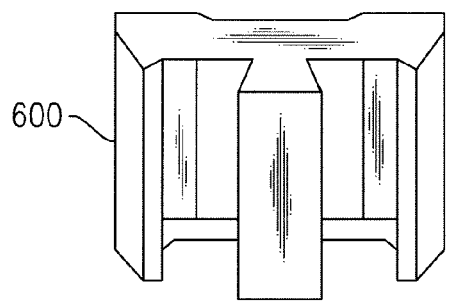
Figure 17D:
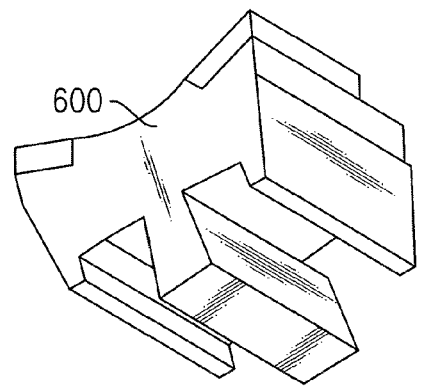
Figure 17E:
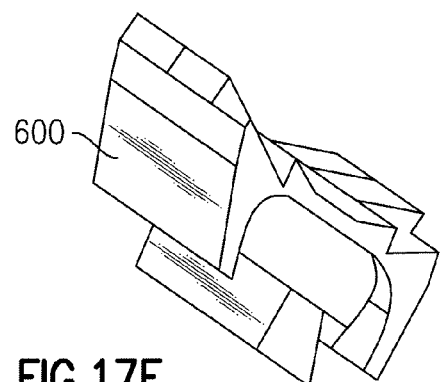

In a sixth embodiment shown in FIGS. 15-16, a tooth 500 and holder 502 are connected to a wheel 504 via a forwardly facing fastener 506 that extends through an opening 508 formed through tooth 500 to engage holder 502, thereby locking tooth 500 in place. Wheel 504 preferably includes a slot 510 formed in a peripheral portion thereof by an arm 512 that accepts and protects fastener 506 during operation of wheel 504.

Figure 18:
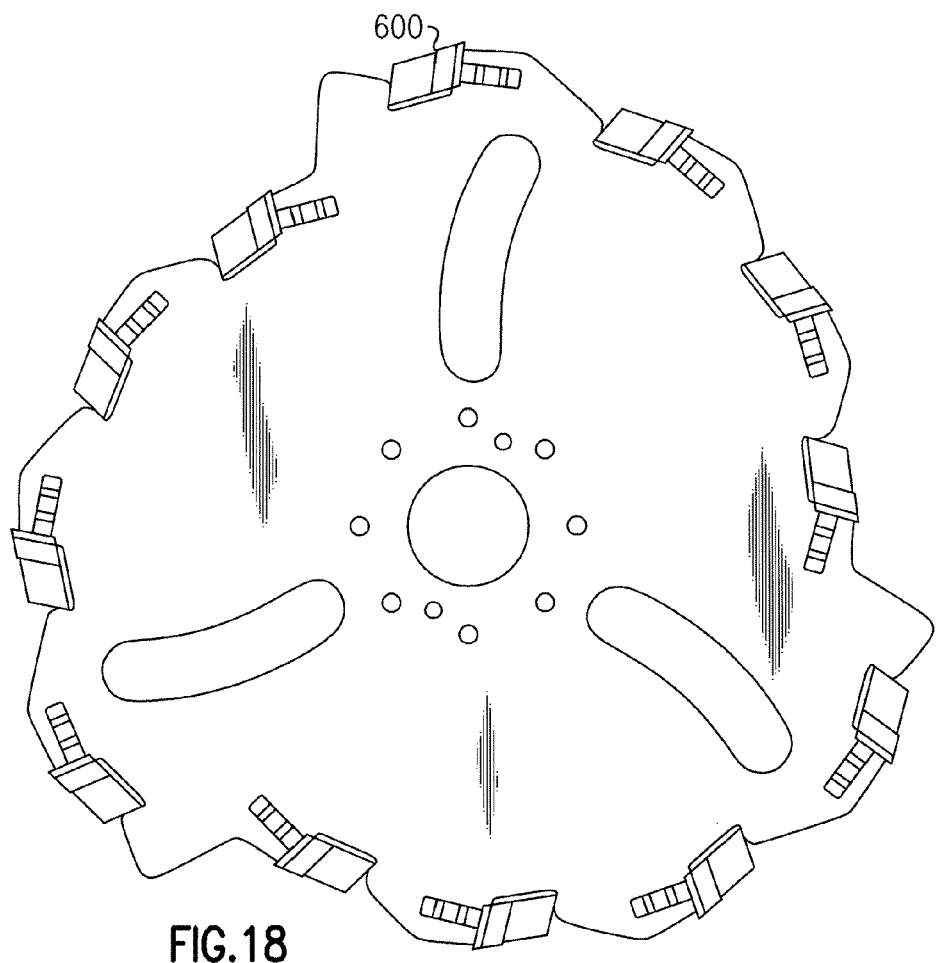
FIG. 18 is a side view of an embodiment of a wheel assembly according to the present invention.
Figure 19:
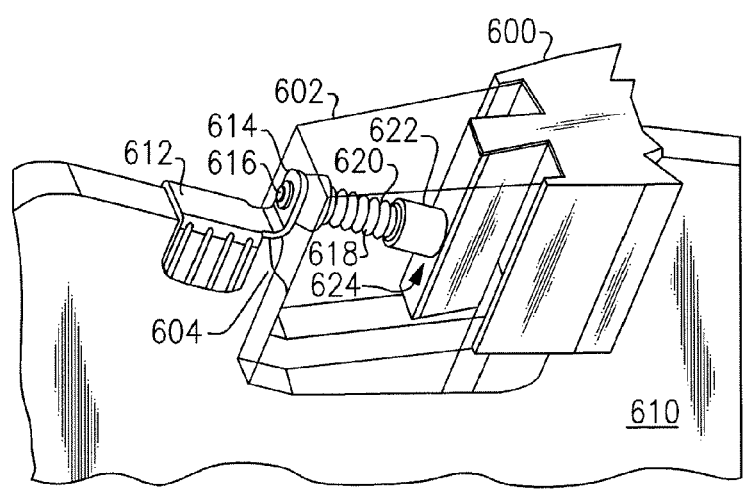
FIG. 19 is a perspective view of an embodiment of a tooth assembly according to the present invention.

In a seventh embodiment shown in FIG. 17-19, a tooth 600 including a dovetailed rear surface 602 is interlocked with a correspondingly dovetailed holder 604. Holder 604 abuts against a shoulder 606 formed in the peripheral edge of wheel 610 and is further held in place by a bracket 612. Bracket 612 including an outwardly extending flange 614, through which a pin 616 may pass for engagement with a spring assembly 618 positioned within holder 614. Spring assembly 618 includes a post 620 having a forward end 622 for engaging a corresponding detent 624 formed in to tooth 600.

Figure 20:
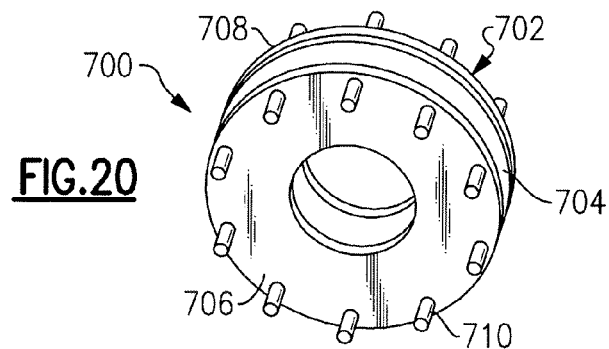
FIG. 20 is an embodiment of a wheel for a tooth assembly according to the present invention.
Figure 21A:
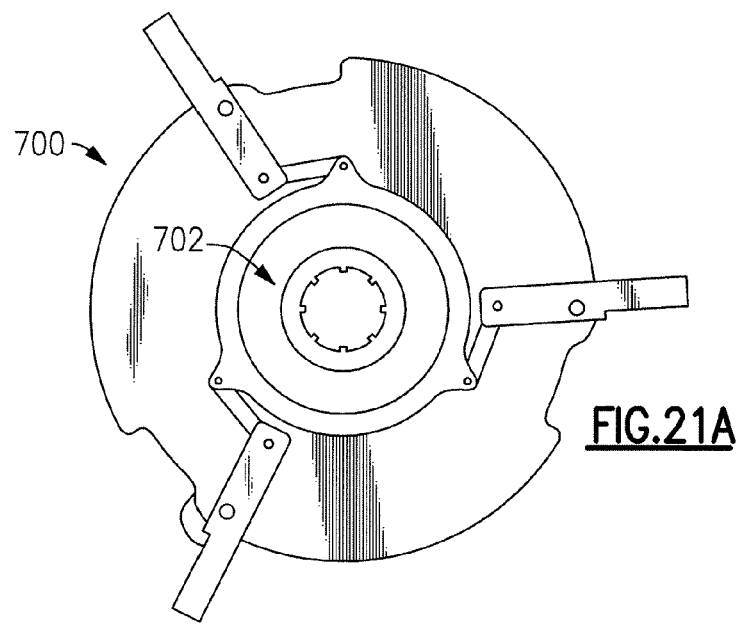
FIG. 21A-21B is an embodiment of a wheel for a tooth assembly according to the present invention.
Figure 21B:
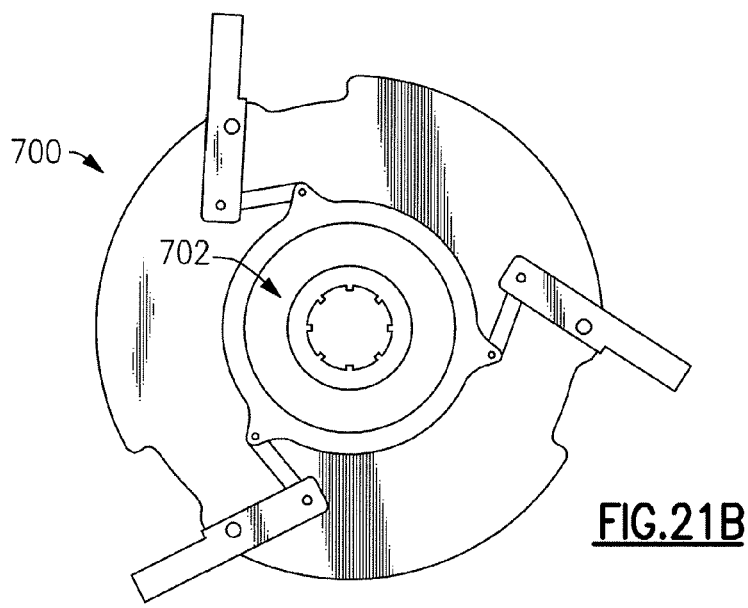

In an eighth embodiment shown in FIGS. 20-21, wheel 700 includes a centrally mounted isolator 702. Isolator 702 comprises a central disc 704 maintained between two opposing plates 706, 708. Disc 704 is preferably formed from a resilient material. Opposing plates 706, 708 are interconnected to grinding elements 710. As a result, vibrations caused by striking hard surfaces, such as rocks, will be transmitted to isolator and absorbed by disc 704.

In an ninth embodiment shown in FIGS. 22-24, a tooth assembly 800 comprising a tooth body 802, a deflector 804, and a holder 806. Tooth body 802 is symmetrical about transverse central, longitudinal plane and comprises opposed front and rear faces 808, 810 and sides 812, 814 to which cutting bits 816, 818 are secured, respectively. The front and rear faces 808, 810 are each recessed from the terminal ends of cutting bits 816, 818 and each taper inwardly from their lower edges to their upper edges.

Deflector 804 and holder 806 are adapted for positing below and above tooth body 802, respectively. The bottom surface 820 of deflector 804 includes a U-shaped channel 822 formed transversely there through for a reason that will be described hereinafter.

A series of co-axially, oval shaped openings 824 are formed through tooth body 802, deflector 804 and holder 806. T-shaped bolt 824 includes an elongated shaft 828 adapted to extend through an be pivotally movable within opening 824, and a cylindrical base member 830 that is adapted to be sealed within U-shaped groove 822. The upper end of shaft 828 is adapted to engage a stump grinding wheel to secure tooth assembly 800 to the wheel.

It should be noted that alternatives to a U-shaped groove 822 and cylindrical base 830 could be employed so long as the functionality of pivotal movement and securing shaft 828 are achieved. For instance, a hemi-spherical nut that sits in a correspondingly shaped, hemispherical indentation formed in the bottom of deflector 804 could be employed.

Due to the symmetry of tooth body 802 and the pivotal movement of shaft 828 within opening 824, if the cutting bits 816, 818 wear out, the tooth body 802 can be reversed to permit the opposite, non-worn edges of cutting bits 816, 818 to be used.

Referring to FIG. 25, there is seen a stump grinding tooth 910 mounted to a mounting block 912 and retained thereon by a clip 914. Stump grinding tooth, designated generally by reference numeral 910, and mounting block 912 are adapted to be secured to a conventional or horizontal stump grinding wheel/cylinder (not shown) as is understood by one of ordinary skill in the art.

Tooth 910 is characterized by a cutting body 916 that includes cutting bits 918, 920 positioned on opposing sides of body 916 with bits 918, 920 each including cutting surfaces that extend to the sides and front of the tooth 910. Tooth 910 further comprises a shaft 922 that extends upwardly from body 916 and includes a decreased diameter neck region 924 and a head 926 that is of greater diameter than the neck region 924. The length of shaft 922 is sufficient to fully extend through a bore formed through mounting block 912 with neck region 924 extending outside of mounting block 912 by a predetermined amount L.

Mounting block 912 includes a bore that accommodates shaft 922 and a top surface 928 defined by a raised shoulder 930 at its rearward side. A notch 932 is defined on the lower surface of mounting block 912 to accommodate and receive tooth body 916 in the notch.

Clip 914 comprises an essentially flat base member 934 having a U-shaped groove 936 defined between two spaced legs 938, 939 that extend forward from a rear section 940, and a resilient spring member 942 that is riveted or otherwise affixed to base member 934 at its rear section 940. Spring member 942 includes a central opening 944 formed therethrough and is positioned in overlying relation to base member 934 with central opening 944 being aligned above U-shaped groove 936. The thickness of spring member 942 and base member 934 collectively is about the same as or just slightly longer than the distance L that neck region 924 extends outside of mounting block 912. Head 926 is sized to pass through central opening 944.

To secure tooth 910 to mounting block 912, shaft 922 is fully passed through the bore of mounting block 912, and clip 914 is then slid along the top surface 928 of mounting block 912 with U-shaped groove 936 being engaged with neck region 924 and until spring member 942 snaps over head 926 with head 926 extending through central opening 944. Clip 914 then slid an additional amount until an area of spring member 942 defining opening 944 engages neck region 924. If assistance is required to get head 926 to engage through opening 944, a user can use his or her finger or a tool (Such as a screwdriver) to pry upwardly on the leading edge of spring member 942.

To detach tooth 910 from mounting block 912, a user can use his or her finger tip or a tool (such as a screwdriver) to pry upwardly on the leading edge of spring member 942 and slide it rearwardly until central opening 942 disengages from head 926. Once disengaged, spring member 942 will bias back to its neutral position in overlying relation to base member 934. Tooth 10 can then be freely slid out from mounting block 912.

A chip deflector 950 may be adhered to tooth 910. Chip deflector 950 serves to move chips away from tooth 910 and mounting block 912 while cutting a stump.

What is claimed is:

1. A stump cutting assembly adapted for mounting to a stump cutting wheel, comprising:
   a. a cutting tooth comprising a body having first and second opposed side surfaces, a front surface extending between said first and second side surfaces, a back surface that is opposite to said front surface, an upper surface from which said first and second opposed side surfaces extend, and a lower surface that is opposite to said upper surface, first and second shoulders formed at the interfaces of said front surface, said back surface, and said first and second side surfaces, respectively, and a first cutting bit with a first cutting surface and a second cutting bit with a second cutting surface wherein said first cutting bit and second cutting bits are seated in said first and second shoulders, respectively, wherein said upper surface is substantially planar and aligned with a first edge of said first cutting bit and a first edge of a second cutting bit;
   b. a holder having an upper surface adapted to be positioned in contacting relation to said lower surface of said cutting tooth and through which an elongated fastener passes when assembled with said cutting tooth and said holder; and
   c. said elongated fastening member adapted for extension through said bottom and upper surfaces of said cutting tooth and through said bottom surface of said holder, whereby said fastening member securely attaches said cutting tooth to said holder.

2. The stump cutting assembly according to claim 1, further comprising a deflector adapted for integral attachment to the cutting wheel and comprising a bottom surface adapted to be positioned in contacting relation to said upper surface of said cutting tooth when said cutting tooth and said holder are assembled on the cutting wheel.

3. The stump cutting assembly according to claim 2, wherein said deflector comprises first and second opposed side surfaces structured to deflect debris that is cut by said cutting tooth.

4. The stump cutting assembly according to claim 3, wherein a shape of said first and second opposed side surfaces of said deflector is concave.

5. A stump cutting assembly adapted for mounting to a stump cutting wheel, comprising:
   a. a cutting tooth comprising a body having first and second opposed side surfaces, a front surface extending between said first and second side surfaces, a back surface that is opposite to said front surface, an upper surface from which said first and second opposed side surfaces extend, and a lower surface that is opposite to said upper surface, first and second shoulders formed at the interfaces of said front surface, said back surface, and said first and second side surfaces, respectively, and a first cutting bit with a first cutting surface and a second cutting bit with a second cutting surface wherein said first and second cutting bits are seated in said first and second shoulders, respectively, wherein said upper surface is substantially planar and aligned with a first edge of said first cutting bit and a first edge of a second cutting bit;
   b. a holder adapted for integral attachment to the cutting wheel and comprising a bottom surface adapted to be positioned in contacting relation to said upper surface of said cutting tooth when said cutting tooth and said holder are assembled on the cutting wheel;
   c. an elongated fastening member adapted for extension through said bottom and upper surfaces of said cutting wheel tooth and through said bottom surface of said holder, whereby said fastening member securely attaches said cutting tooth to said holder; and
   d. a deflector having an upper surface adapted to be positioned in contacting relation to said upper surface of said cutting tooth through which said elongated fastener passes when assembled with said cutting tooth and said holder.

6. A stump cutting tooth assembly, comprising:
   a. a body having a medial portion and first and second wing portions shoulders, said medial portion and having opposing front and rear surfaces, and opposing upper and lower surfaces, and opposing first and second side surfaces, and said first and second wing portions shoulders formed at the interfaces of said front surface, said rear surface, and first and second side surfaces, respectively, and having respective first and second side faces with respective terminal, leading edges
   b. a first and second stump cutting tooth bits seated in each of said first and second wing portions shoulders, respectively, wherein said upper surface is substantially planar and aligned with a first edge of said first stump cutting tooth bit and a first edge of a second stump cutting tooth bit.

\* \* \* \* \*